(12) United States Patent
Qvint et al.

(10) Patent No.: US 7,144,037 B2
(45) Date of Patent: Dec. 5, 2006

(54) SAFETY DEVICE

(75) Inventors: Peter Qvint, Vargarda (SE); Mats Karlin, Vargarda (SE)

(73) Assignee: Autoliv Development AB, Vargarda (SE)

( * ) Notice: Subject to any disclaimer, the term of this patent is extended or adjusted under 35 U.S.C. 154(b) by 402 days.

(21) Appl. No.: 10/791,496

(22) Filed: Mar. 2, 2004

(65) Prior Publication Data

US 2004/0232676 A1    Nov. 25, 2004

(30) Foreign Application Priority Data

Mar. 6, 2003   (GB) ................. 0305164.6
Jan. 14, 2004  (GB) ................. 0400779.5

(51) Int. Cl.
*B60R 21/16*    (2006.01)
*B60R 21/28*    (2006.01)

(52) U.S. Cl. ................ 280/739; 24/602; 24/603

(58) Field of Classification Search ........... 24/602, 24/603; 280/739

See application file for complete search history.

(56) References Cited

U.S. PATENT DOCUMENTS 5,234,229 A     8/1993   Gordon
5,695,214 A    12/1997   Faigle et al.
6,082,765 A     7/2000   Bowers et al.
6,648,371 B1 *  11/2003  Vendely et al. ............. 280/739
7,017,945 B1 *   3/2006  DePottey et al. ........... 280/739

FOREIGN PATENT DOCUMENTS

EP      1356998 A1   10/2003

* cited by examiner

*Primary Examiner*—Ruth Ilan
(74) *Attorney, Agent, or Firm*—Brinks Hofer Gilson & Lione

(57) ABSTRACT

A safety device is disclosed which is configured to be actuated by the supply of gas. The safety device incorporates an outlet vent pipe which is sealed by a releasable clip. The releasable clip has a first elongate main gripping element and a second elongate moveable gripping element. The main gripping element has a retaining element to retain one end of the moveable gripping element. The safety device also includes an arrangement to retain the other end of the moveable gripping element in a predetermined position such that the clip may grip a fabric tube or the like between the main gripping element and the moveable gripping element. A mechanism is provided which responds to a supply signal to move the other end of the moveable gripping element to release the grip.

20 Claims, 5 Drawing Sheets

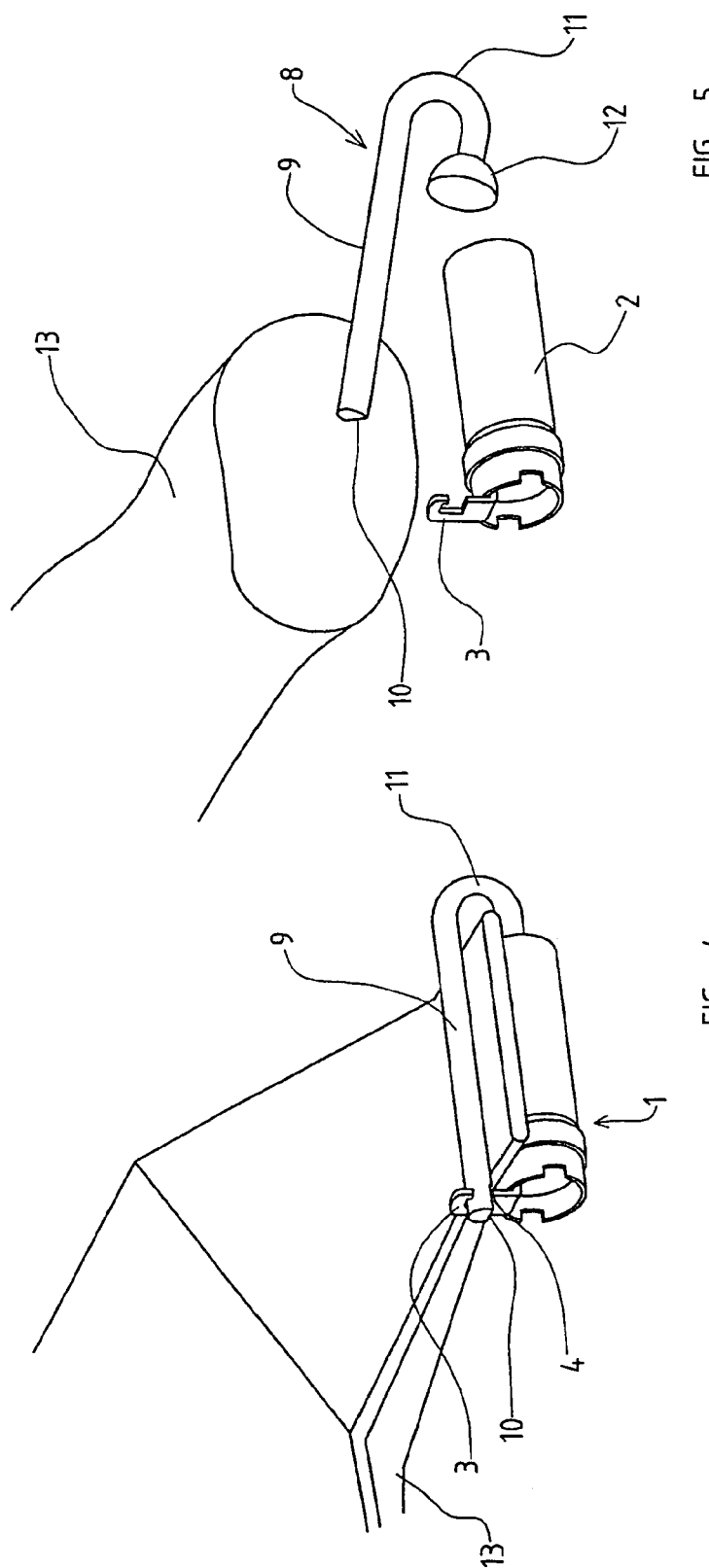

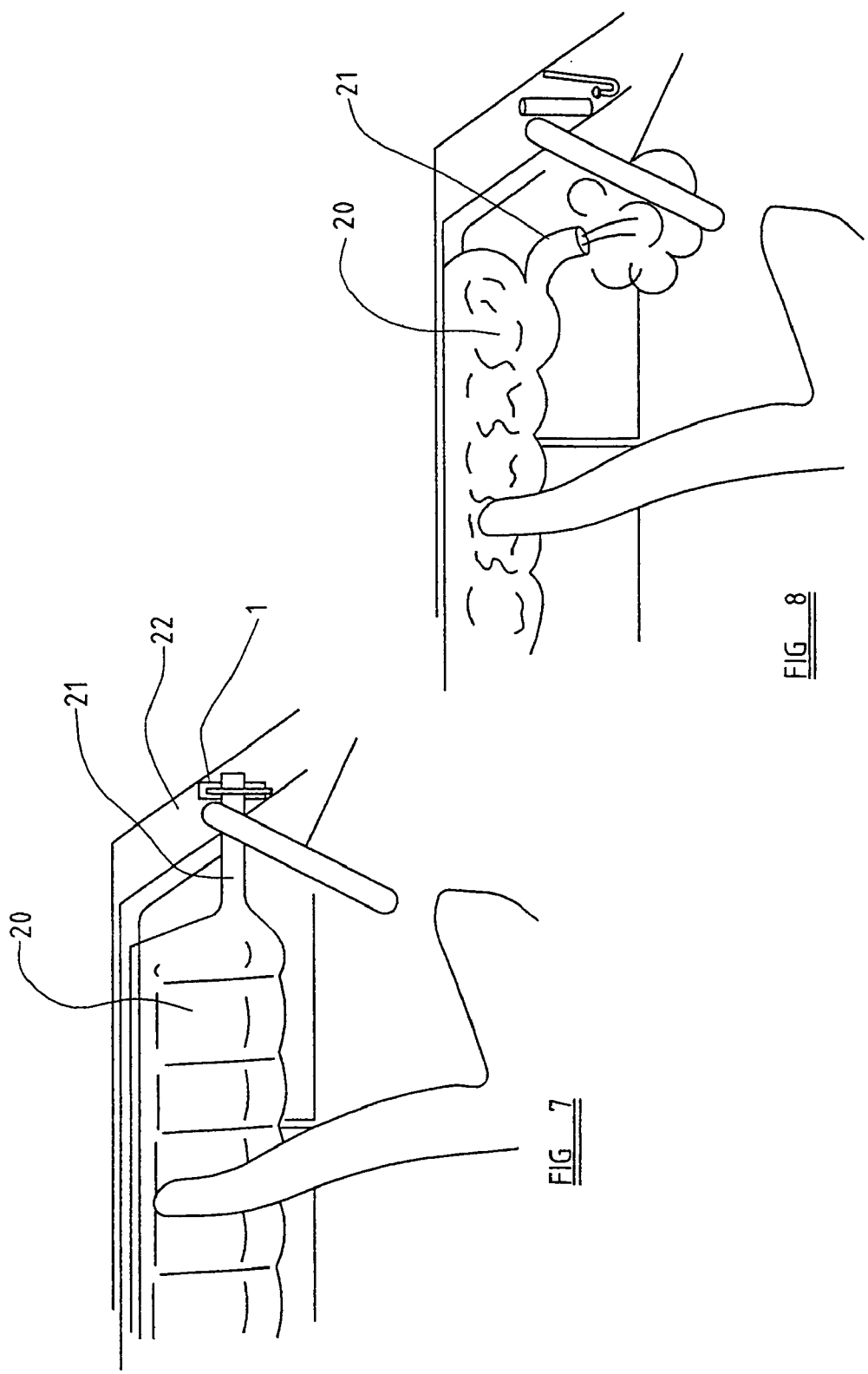

SAFETY DEVICE

CROSS REFERENCE TO RELATED APPLICATION

This application claims priority to GB 0305164.6, filed Mar. 6, 2003 and GB 0400779.5, filed Jan. 14, 2004 which are currently pending.

BACKGROUND OF THE INVENTION

The present invention relates to a safety device.

It has been proposed to provide various forms of safety device to provide protection for an occupant of a vehicle in the event that an accident should occur. For example, various types of air-bag have been proposed which, depending upon their design, may occupy many different positions within a vehicle relative to a driver. When an air-bag is to be deployed, a gas generator is actuated which generates gas which serves to inflate the air-bag.

In some cases it is desirable for the pressure in the air-bag to be controlled and/or for the air-bag to be "vented", especially if the occupant has a weight which is not typical, either being relatively heavy or being relatively light, or, alternatively, if the occupant is "out of position" (for example leaning forwardly).

Various proposals have been made for mechanisms to ventilate an air-bag including controlled valves, burst discs and tear-seams which initially seal an outlet air vent. Sophisticated arrangements may include elements such as pressure sensors and/or control units to determine the weight and the position of an occupant and to control the opening of a gas exhaust valve in an optimal manner.

However, there is a requirement for a simple device to control the ventilation of an air-bag which can be used in a flexible manner to provide ventilation at different positions within an air-bag.

Other safety devices also rely on generated gas, such as pre-tensioners, and there is a requirement for a mechanism that may be utilised to control the operation of such safety devices.

Accordingly, to a first aspect of the present invention, there is provided a safety device in the form of a releasable clip, the releasable clip having a first elongate main gripping element, and a second elongate moveable gripping element, the main gripping element having a retaining element to retain one end of the moveable griping element; there being an arrangement to retain the other end of the moveable gripping element in a predetermined position such that the clip may grip a fabric tube or the like between the main gripping element and the moveable gripping element; a mechanism being provided which responds to a supply signal to move the other end of the moveable gripping element to release the grip.

According to another aspect of the present invention, there is provided a safety device configured to be actuated by the supply of gas, the safety device incorporating an outlet vent pipe, the outlet vent pipe being sealed by a releasable clip, the releasable clip having a first elongate main gripping element, and a second elongate moveable gripping element, the main gripping element having a retaining element to retain one end of the moveable gripping element; there being an arrangement to retain the other end of the moveable gripping element in a predetermined position such that the clip may grip the outlet vent pipe or the like between the main gripping element and the moveable gripping element; a mechanism being provided which responds to a supply signal to move the other end of the moveable gripping element to release the grip.

Preferably, the safety device is an air-bag.

Advantageously, the safety device is a pretensioner.

Conveniently, a plurality of said releasable clips are provided, each clip being associated with a respective outlet hose.

Preferably, the releasable clip incorporates a spring initially held in a compressed state and released in response to the signal so as to move the other end of the moveable retaining element.

Advantageously, the main gripping element is in the form of a cylinder, and the other end of the elongate moveable gripping element is configured to fit over or within the cylinder; there being a mechanism to supply gas to the interior of the cylinder in response to the signal to move the other end of the moveable gripping element.

Conveniently, the other end of the moveable gripping element is constituted by a piston movable within the cylinder.

In one embodiment the cylinder has a terminal inward projection to retain the piston in the cylinder.

Preferably, the other end of the moveable gripping element comprises a closure cap dimensioned to close an open end of the cylinder.

Advantageously, the source of gas is a pyrotechnic squib.

Alternatively, the source of gas is a source of compressed gas.

Preferably, the moveable gripping element is provided with an elongate cylindrical gripping portion, one end of which is engaged in a retaining lug provided on the main gripping element.

Advantageously, the main gripping element is in the form of a cylindrical housing, and the moveable gripping element has inclined resiliently mounted walls to engage the exterior of the cylindrical main gripping element.

In order that the invention may be more readily understood, and so that further features thereof may be appreciated, the invention will not be described, by way of example, with reference to the accompanying drawings in which:

BRIEF DESCRIPTION OF THE DRAWINGS

FIG. 4 is a view showing the clip unit of FIGS. 1 to 3 mounted on an outlet duct of an air-bag;

FIG. 5 is a view corresponding to FIG. 4 showing the clip unit when released;

FIG. 7 is a view illustrating an air-bag in a motor vehicle provided with a pyrotechnic clip unit of the type described above during inflation of an air-bag;

FIG. 8 is a view corresponding to FIG. 6 showing the clip unit when released.

DETAILED DESCRIPTION OF THE INVENTION

Figure 1:
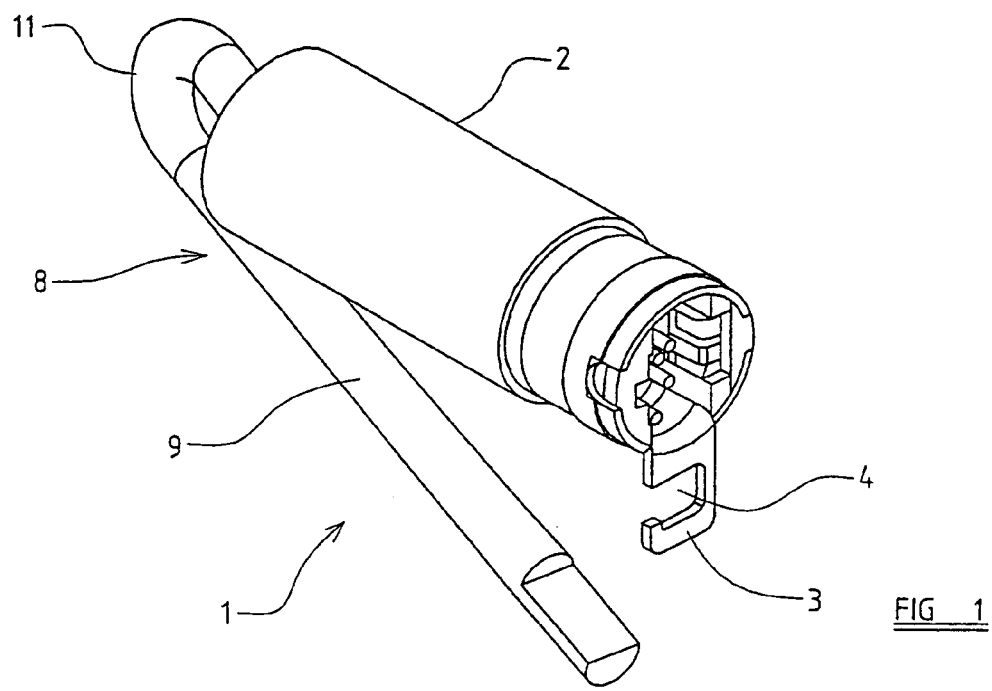
FIG. 1 is a perspective view of a pyrotechnic clip unit.
Figure 2:
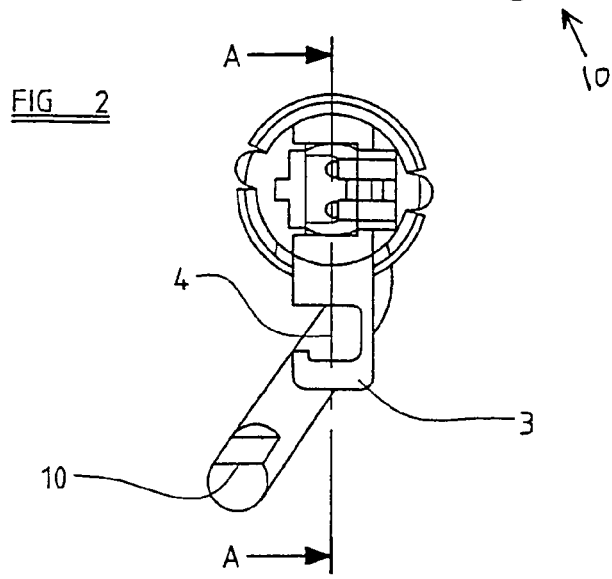
FIG. 2 is an end view of the unit of FIG. 1.
Figure 3:
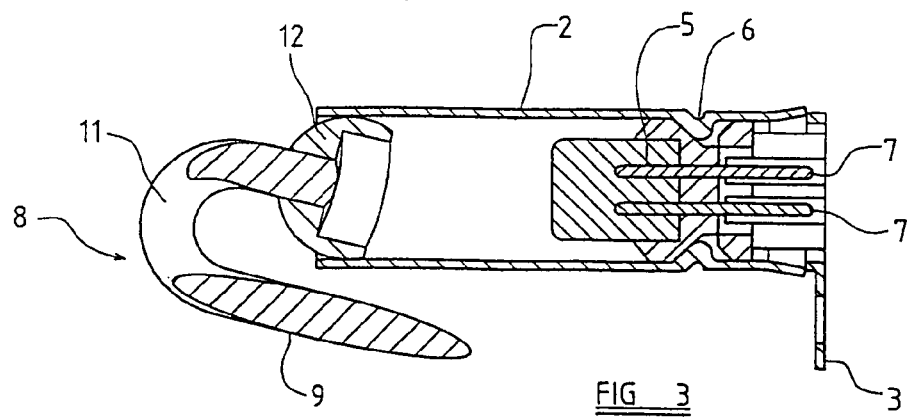
FIG. 3 is a sectional view, on an enlarged scale, taken on the line A—A of FIG. 2.

Turning initially to FIGS. 1 to 3 of the accompanying drawings, a pyrotechnic clip unit 1 is illustrated, the pyrotechnic clip unit being configured so that, when in use, it may close an outlet hose or duct, formed of a material such as fabric, forming part of an air-bag or forming part of another safety device.

The clip 1 comprises an elongated hollow cylindrical housing 2 which forms a main gripping element, one end of the housing being provided with an integral deflected retaining bracket 3 in the form of a lug. The retaining bracket 3 defines a "U"-shaped slot 4 which opens into one side edge of the retaining bracket 3.

The end of the hollow cylindrical housing 2 provided with the retaining bracket 3 receives a pyrotechnic squib 5 which is held by a crimp 6 as illustrated most clearly in FIG. 3. The pyrotechnic squib 5 contains a pyrotechnic charge and is associated with two electrodes 7 which are accessible from the open end of housing 2. A plug may be connected to the electrodes 7. When a current passes between the electrodes 7, the pyrotechnic squib 5 is ignited to generate a substantial quantity of gas.

A moveable gripping element 8 is provided, the gripping element 8 including a elongated cylindrical gripping section 9 having a terminal region 10 configured to be received within the "U"-shaped slot 4 formed in the retaining bracket 3. The other end of the gripping section 9 is provided with a 180° bend 11 which connects the gripping section 9 to a piston 12 which is dimensioned to be received, as a sliding fit, within the hollow tube 2. The piston 12 may have a semi-spherical head so as to provide a substantially sealing fit even if the piston is not precisely aligned with the longitudinal axis of the hollow cylindrical housing 2.

Referring now to FIG. 4, the clip 1 of FIGS. 1 to 3 is shown in position on the terminal part of a tube 13 which may be a fabric tube extending from an air-bag to constitute a gas vent, or which may be a fabric tube extending from part of some other safety device which is deployed by the generation of gas.

It will be understood that the terminal part of the tube 13 has been located in position generally between the cylindrical housing 2 and the gripping section 9 of the moveable gripping element 8. The terminal part 10 of the gripping section 9 has been manipulated to be received within the "U"-shaped slot 4 of the retaining bracket 3, thus firmly trapping the fabric of the tube 13 between the gripping section 9 of the moveable gripping element 8, and the outer surface of the cylindrical housing 2. The clip 1 thus forms a substantially air-tight seal at the end of the tube 13.

Should an appropriate electrical signal be supplied to the electrodes 7, the pyrotechnic squib 5 will be ignited generating a substantial quantity of gas within the cylinder 2. The gas will act on the piston 12 moving the piston 12 axially of the cylindrical housing 2, and thus withdrawing the terminal part 10 of the moveable gripping element 8 from the "U"-shaped slot 4 formed in the retaining bracket 3. The moveable gripping element 8 thus moves relative to the main gripping element formed by the housing 2. Indeed, the entire gripping element 8 may, as shown in FIG. 5, become totally separated from the cylindrical housing 2. Thus the tube 13 is no longer retained in a sealed condition and gas may escape from the air-bag through the tube 13.

It is to be understood that a number of clips of the type described above may be provided on a typical air-bag at a number of different positions, and the actuation of the clips may be controlled by an appropriate control arrangement associated with appropriate sensors. Consequently a number of the described clips may be provided on various gas ducts 13 forming part of a single air-bag, and one or more of the clips may be released. If more than one clip is released, the clips may be released at appropriate times during an accident situation, in dependence upon the particular circumstances of an accident involving a vehicle in which the air-bag is mounted.

Whilst, in the above-described embodiment of the invention, the movable gripping element may, as shown in FIG. 5, become totally separated from the cylindrical housing, in some circumstances this may be undesirable. The gripping element 8 may, if it leaves the cylindrical housing with a substantial velocity, act as a projectile which may be extremely undesirable.

Figure 6:
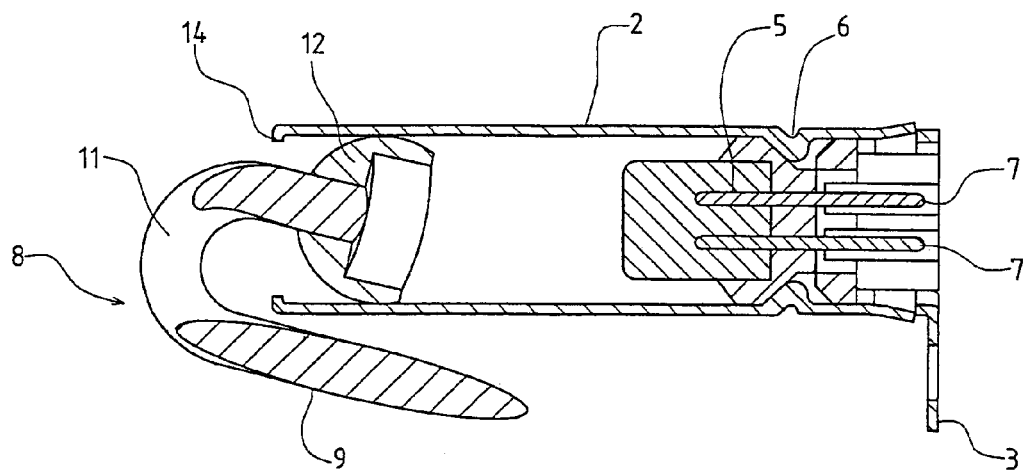
FIG. 6 is a view corresponding to FIG. 1 illustrating a modified embodiment of the invention.

Thus, in the embodiment of FIG. 6, a terminal part of the cylindrical housing 2, at the end remote from the pyrotechnic squib 5, a projection which extends radially inwardly is provided, in the form of a flange 14. The flange 14 may be a flange which extends totally around the open end of the cylindrical housing 2, or may be a flange which extends only part-way around the end of the housing. The flange may be replaced by an inwardly directed crimp located adjacent the end of the housing. The flange, or crimp, form a terminal inwardly directed projection which prevents the piston 12 from escaping from within the cylinder. Thus the piston 12 is retained within the cylinder 2, preventing the gripping element 8 from becoming a projectile.

Referring now to FIGS. 7 and 8, merely by way of an example, an air-bag 20 in the form of a so-called "inflatable curtain" is illustrated, the air-bag 20 having a forwardly extending restraining strap 21 which is in the form of a hollow tube in fluid communication with the invention of the main part of the air-bag 20. The free end of the tube is receive within a clip 1 as descried above, the cylindrical housing 2 of the clip 1 being securely fastened to the "A"-Post 22 of the illustrated vehicle. Thus the clip 1 seals the tubular strap 21 and also anchors the end of the strap in position.

In ordinary deployment of the inflatable curtain, gas will be injected into the inflatable parts of the inflatable curtain, but will not be able to escape through the tubular strap 21, because the tubular strap 21 is maintained closed by the action of the clip 1. The clip 1 also holds the tubular restraining strap 21 securely in position.

Should a particular set of circumstances arise, in which it is appropriate to release the restraining strap 21 and deflate the deflatable curtain, the clip 1 may be released, in the manner described above, by actuating the pyrotechnic squib 5, as shown in FIG. 7, thus releasing the end of the tubular restraining strap 21 permitting gas to escape from the inflated interior of the inflatable curtain 20 through the thus released tubular strap 21, as shown in FIG. 7.

Figure 9:
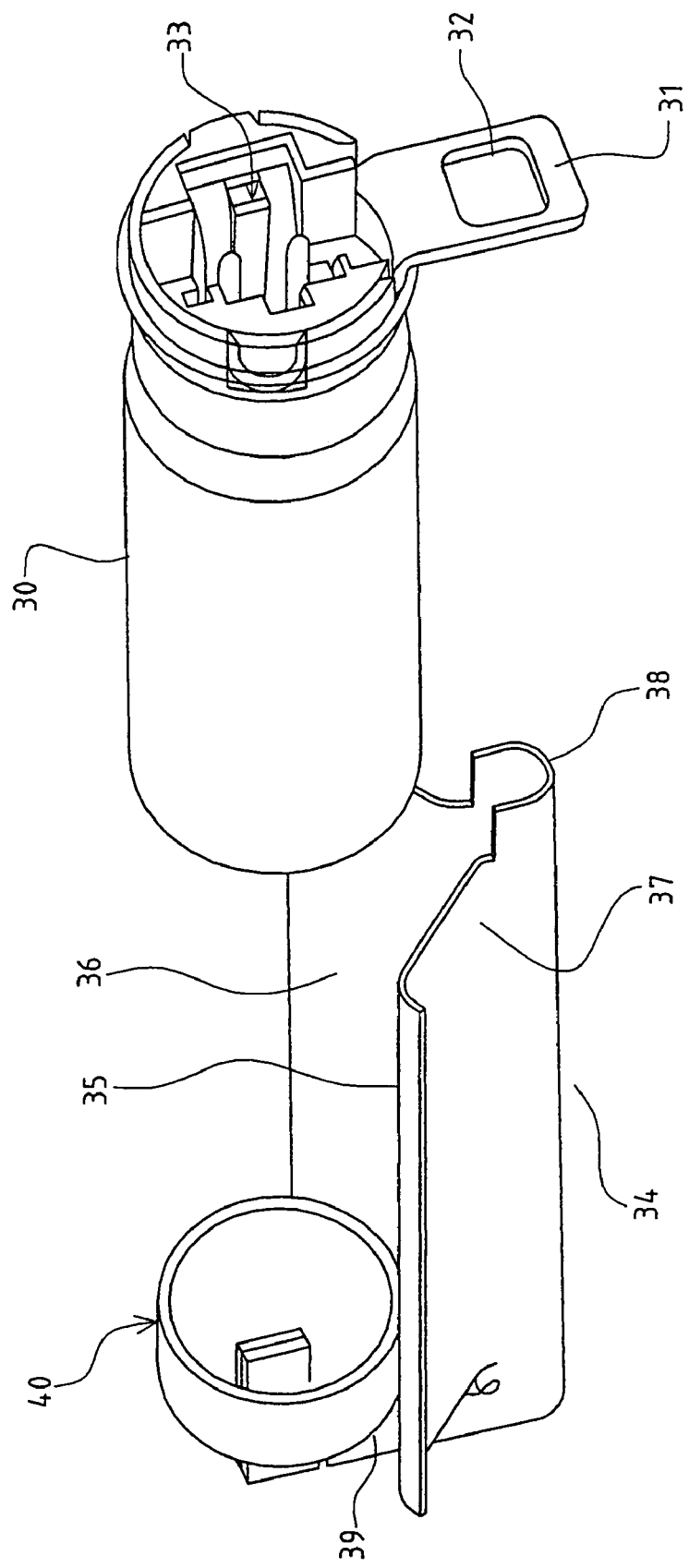
FIG. 9 is a perspective view of an alternative form of clip unit in accordance with the invention.

Whilst the invention has been described above with reference to one form of releasable clip, FIG. 9 illustrates a modified form of releasable clip. The clip of FIG. 9 includes a hollow tubular housing 30 forming a main gripping element and having, at one end, a deflected retaining bracket 31 in the form of a lug which defines a square aperture 32. Received within that end of the tubular housing 31 is a squib 33 corresponding to the squib 5 as described above.

Associated with the housing 30 is a moveable gripping element 34. The moveable gripping element 34 is formed of a pressed sheet metal plate, the pressed plate defining two inwardly directed opposed resiliently mounted walls 35, 36 having a substantially "V" configuration, the lower ends of the walls being interconnected by a "U"-shaped trough 37. At one end, the trough 37 extends axially to form a projection 38. The projection 38 is dimensioned to be received within the square aperture 32 in the retaining bracket 31. At the other end, the trough 37 carries an upstanding support 39 which extends up between the walls 35, 36, and which carries a closure cap 40 dimensioned to fit over and close, in a sealing manner, the open end of the housing 30 remote from the squib 33.

It is to be appreciated that the moveable gripping element 34 is so configured that when the projection 38 of the trough 37 is received within the aperture 32, the closure cap 40 sealing closes the end of the housing 30 remote from the squib 33, and the walls 35, 36, due to their own resilient mounting, are biased against the exterior of the housing 30.

It will be appreciated that the clip may be mounted on a hose, equivalent to the tube 13 as shown in FIGS. 4 and 5, with the hose being partly wrapped around the cylindrical housing 30, and with the hose being gripped by the two resiliently biased walls 35, 36. The engagement of the projection 38 within the aperture 32, and the engagement of the sealing cap 40 with the end of the housing 30 ensures that the moveable gripping element 34 remains in position. Should, however, an electric charge be applied to the pyrotechnic squib 5, a substantial quantity of gas will be injected into the interior of the hollow housing 30, thus driving the sealing cap 40 away from the end of the housing 30 remote from the squib 33, consequently serving to withdraw the projection 38 from the aperture 32, and releasing the moveable gripping element 34 from the housing 30.

Whilst the invention has been described with specific reference to clips in which gas is generated by a pyrotechnic squib in response to a signal, it is to be understood that in a modified embodiment, instead of using the squib, a source of compressed gas that is opened by a signal may be used, or even a clip that includes a spring which is retained in a compressed state and released in response to a signal to release the clip.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A safety device including a releasable clip, the releasable clip having a main gripping element in the form of an elongated hollow cylinder having a first and second end, and an elongated moveable gripping element having a first and second ends, the main gripping element first end having a retaining element to retain the first end of the moveable gripping element; the main gripping element second end affixing the second end of the moveable gripping element in a predetermined position such that the clip may grip a gas flow duct of the safety device between the main gripping element and the moveable gripping element; the second end of the elongated moveable gripping element is configured to fit over or within the hollow cylinder; a gas generator being provided which supplies gas to the interior of the hollow cylinder in response to a supply signal to move the second end of the moveable gripping element to cause the first ends of the main gripping element and the moveable gripping element to disengage and release the gripping of the duct.

2. A safety device according to claim 1 further comprising the gas flow duct provided in the form of an outlet duct, the outlet duct being sealed by the releasable clip.

3. A safety device according to claim 1 wherein the safety device includes an inflatable air-bag and the gas flow duct enables venting of the interior of the air-bag.

4. A safety device according to claim 2 wherein a plurality of the releasable dips are provided, each of the clips being associated with a respective outlet duct.

5. A safety device according to claim 1 wherein the second end of the moveable gripping element is a piston moveable within the hollow cylinder.

6. A safety device according to claim 5 wherein the hollow cylinder has a terminal inward projection to retain the piston in the hollow cylinder.

7. A safety device according to claim 5 wherein the second end of the moveable gripping element comprises a closure cap dimensioned to close an open end of the hollow cylinder.

8. A safety device according to claim 1 wherein the gas generator Is a pyrotechnic squib.

9. A safety device according to claim 1 wherein the gas generator Is a source of compressed gas.

10. A safety device according to claim 1 wherein the first end of the main gripping element comprises a retaining element in the form of a lug.

11. A safety device including a releasable clip, the releasable clip having a main gripping element in the form of an elongated hollow cylinder having a first and second end, and an elongated moveable gripping element having a first and second end; the moveable gripping element having inclined resiliently mounted walls to engage the exterior of the cylindrical housing of the main gripping element; the main gripping element first end having a retaining element to retain the first end of the moveable gripping element; the main gripping element second end affixing the second end of the moveable gripping element in a predetermined position such that the clip may grip a gas flow duct of the safety device between the main gripping element and the moveable gripping element the second end of the elongated moveable gripping element is configured to fit over or within the hollow cylinder; a gas generator being provided which supplies gas to the interior of the hollow cylinder in response to a supply signal to move the second end of the moveable gripping element to cause the first ends of the main gripping element and the moveable gripping element to disengage and release the gripping of the duct.

12. A releasable clip for a safety device, the releasable dip including a main gripping element in the form of an elongated hollow cylinder defining a first and second end, the main gripping element first end having a retaining bracket, and the second end of the main gripping element being opened, a moveable gripping element having a first and a second end, the first end of the moveable gripping element received by the retaining bracket, the second end of the moveable gripping element obstructing the second opened end of the main gripping element, a gas generator communicating with the hollow cylinder, the releasable clip in a first predetermined position gripping a gas flow duct of the safety device between the main gripping element and the moveable gripping element, and in response to a supply signal supplying gas within the hollow interior moving the moveable gripping element second end and disengaging the moveable gripping element second end from the retaining bracket to release the gripping of the duct.

13. A safety device according to claim 12 wherein the safety device includes an air-bag.

14. A safety device according to claim 12 wherein a plurality of the releasable clips are provided, each of the clips being associated with a respective gas flow duct.

15. A safety device according to claim 12 wherein the second end of the moveable gripping element is a piston moveable within the hollow cylinder.

16. A safety device according to claim 15 wherein the hollow cylinder has a terminal inward projection to retain the piston in the hollow cylinder.

17. A safety device according to claim 12 wherein the second end of the moveable gripping element comprises a closure cap dimensioned to close the second opened end of the hollow cylinder.

18. A safety device according to claim 12 wherein the gas generator is a pyrotechnic squib disposed inside the hollow cylinder.

19. A safety device according to claim 12 wherein the gas generator is a source of compressed gas.

20. A Safety device according to claim 12 wherein the main gripping element is in the form of a cylindrical housing, and the moveable gripping element has inclined resiliently mounted walls to engage the exterior of the cylindrical housing of the main gripping element.

* * * * *

UNITED STATES PATENT AND TRADEMARK OFFICE
CERTIFICATE OF CORRECTION

PATENT NO. : 7,144,037 B2  Page 1 of 1
APPLICATION NO. : 10/791496
DATED : December 5, 2006
INVENTOR(S) : Peter Qvint et al.

It is certified that error appears in the above-identified patent and that said Letters Patent is hereby corrected as shown below:

Column 5, in claim 1, line 5, after "second" delete "ends" and substitute --end--.

Column 6, in claim 4, line 2, after "of the releasable" delete "dips" and substitute --clips--.

Column 6, in claim 11, line 14, immediately after "gripping element" insert --;-- (semicolon).

Colum 6, in claim 12, line 1, after "the releasable" delete "dip" and substitute --clip--.

Column 8, in claim 20, line 1, before "device according to" delete "Safety" and substitute --safety-- in its place.

Signed and Sealed this

Tenth Day of April, 2007

JON W. DUDAS
*Director of the United States Patent and Trademark Office*